(12) United States Patent
Yu

(10) Patent No.: US 7,775,143 B2
(45) Date of Patent: Aug. 17, 2010

(54) WORK TABLE HAVING ADJUSTABLE HOSE SUPPORT

(76) Inventor: Ben Yu, No. 57, Donyin 13th Road, Taichung 40147 (TW)

( * ) Notice: Subject to any disclaimer, the term of this patent is extended or adjusted under 35 U.S.C. 154(b) by 203 days.

(21) Appl. No.: 12/008,868

(22) Filed: Jan. 14, 2008

(65) Prior Publication Data

US 2009/0178593 A1  Jul. 16, 2009

(51) Int. Cl.
  B26D 7/18 (2006.01)
  B27B 5/29 (2006.01)
  B27G 3/00 (2006.01)
  B27G 19/02 (2006.01)

(52) U.S. Cl. .................. 83/100; 83/477.2; 83/478; 144/252.1; 144/286.1

(58) Field of Classification Search ............ 83/100, 83/167, 397.1, 473, 477.2, 478, 544–546, 83/859, 860; 15/312.1, 312.2, 314; 144/252.1, 144/252.2, 286.1, 286.5, 287; 409/137; 451/456
See application file for complete search history.

(56) References Cited

U.S. PATENT DOCUMENTS

| | | | | |
|---|---|---|---|---|
| 4,201,256 A | * | 5/1980 | Truhan | 144/252.2 |
| 4,367,665 A | * | 1/1983 | Terpstra et al. | 83/100 |
| 4,517,869 A | * | 5/1985 | Kuhlmann et al. | 83/100 |
| 4,576,072 A | * | 3/1986 | Terpstra et al. | 83/102.1 |
| 5,040,444 A | | 8/1991 | Shiotani et al. | 83/473 |
| 5,967,717 A | | 10/1999 | Tucker et al. | 409/137 |
| 6,293,321 B1 | * | 9/2001 | Chiang | 144/252.1 |
| 6,532,643 B2 | | 3/2003 | Wang | 29/560 |
| 6,796,208 B1 | * | 9/2004 | Jorgensen | 83/100 |
| 7,000,515 B2 | * | 2/2006 | Jorgensen | 83/100 |
| 7,559,268 B2 | * | 7/2009 | Sasaki et al. | 83/100 |
| 2005/0098006 A1 | * | 5/2005 | Jorgensen | 83/100 |
| 2006/0185484 A1 | * | 8/2006 | Sasaki et al. | 83/100 |
| 2006/0201295 A1 | * | 9/2006 | Jorgensen | 83/100 |

FOREIGN PATENT DOCUMENTS

DE  33 40 579  *  5/1985 ............ 144/252.1

* cited by examiner

Primary Examiner—Clark F. Dexter
(74) Attorney, Agent, or Firm—Raymond Y. Chan; David and Raymond Patent Firm

(57) ABSTRACT

A work table includes a table plate having a slot for attaching a tool device, and a coupler for coupling to a vacuum device, a shield engaged onto the tool device for shielding the tool device and for gathering the dust, a hose coupling device coupled between the shield and the coupler, and a supporting device for adjustably supporting the hose coupling device to the work table at any required position. The hose coupling device may include two flexible hose members coupled to the shield and the coupler, and a rigid hose member coupled between the flexible hose members, and a rod extended from the rigid hose member for adjustably securing to the table with one or more brackets.

4 Claims, 4 Drawing Sheets

WORK TABLE HAVING ADJUSTABLE HOSE SUPPORT

BACKGROUND OF THE INVENTION

1. Field of the Invention

The present invention relates to a work table, and more particularly to a work table including a supporting device for adjustably attaching and supporting a hose to the work table and for suitably positioning the hose to the work table at the required or the predetermined position and for preventing the hose from interfering with the operation of the work table.

2. Description of the Prior Art

Typical work tables comprise a base table body and a machining tool device, such as a table saw, a round saw, a milling tool, a cutting device, a grinding member or other machining tools supported in the base table body for working or machining the work pieces.

For example, U.S. Pat. No. 5,040,444 to Shiotani et al. discloses one of the typical saw blade position setting apparatuses comprising a circular saw supported in a support frame, a safety cover engaged onto the circular saw for shielding the cut chips and for preventing the cut chips from flying everywhere, and a hose member for discharging the cut chips.

However, normally, the hose member for discharging the cut chips is not supported in place and may interfere with the operation of the work table.

U.S. Pat. No. 5,967,717 to Tucker et al. discloses another typical router table fence system comprising a dust chute for gathering the dust and coupled to a dust removal system or vacuum cleaner.

However, similarly, the hose member coupled to the dust chute for discharging the dust is also not supported in place and may interfere with the operation of the router table.

U.S. Pat. No. 6,532,643 to Wang discloses a further typical table tool having a movable shield and comprising one or more cutting or sawing tool members, and a shield movably attached to the table and having a mouth for coupling to a vacuum cleaner or vacuum device.

However, similarly, the hose member coupled to the mouth for discharging the dust or the cut chips also may not be suitably or adjustably supported in place and may interfere with the operation of the table tool.

The present invention has arisen to mitigate and/or obviate the afore-described disadvantages of the conventional work tables or machining tools.

SUMMARY OF THE INVENTION

The primary objective of the present invention is to provide a work table including a supporting device for adjustably attaching and supporting a hose to the work table and for suitably positioning the hose to the work table at the required or the predetermined position and for preventing the hose from interfering with the operation of the work table.

In accordance with one aspect of the invention, there is provided a work table comprising a table body including a table plate disposed on top for supporting a work piece, and including a slot formed in the table plate for attaching a tool device, and including a coupler, a shield engaged onto the tool device for covering and shielding the tool device and for gathering a dust, a hose coupling device coupled between the shield and the coupler, and a supporting device for supporting the hose coupling device to the table body at any required position and for preventing the hose from interfering with the operation of the work table.

The hose coupling device includes a first flexible hose member coupled to the shield, a second flexible hose member coupled to the coupler, and a rigid hose member coupled between the first and the second flexible hose members, and the supporting device includes a rod extended from the rigid hose member for adjustably securing to the table body.

The supporting device includes at least one bracket secured to the table body and having a casing, and the casing includes chamber formed therein for slidably receiving the rod and for allowing the rod to be moved or slid or adjusted relative to the table body and for adjustably attaching and supporting the hose coupling device to the table body at the required position.

The supporting device includes a fastener threaded or attached or secured to the bracket for engaging with the rod and for adjustably securing the rod and the hose coupling device to the table body of the work table to any required or the predetermined position.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
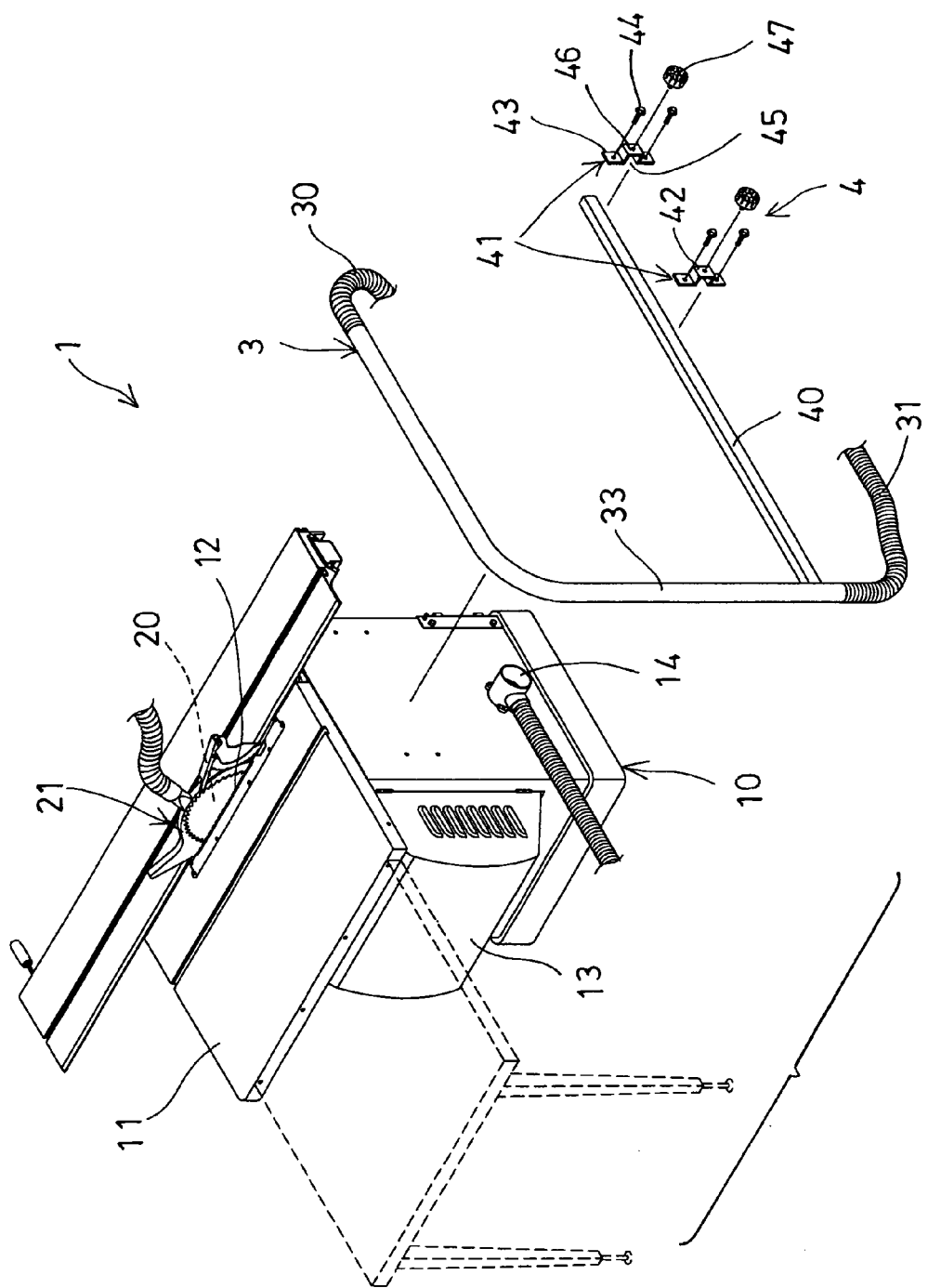
FIG. 1 is a partial exploded view of a work table in accordance with the present invention.
Figure 2:
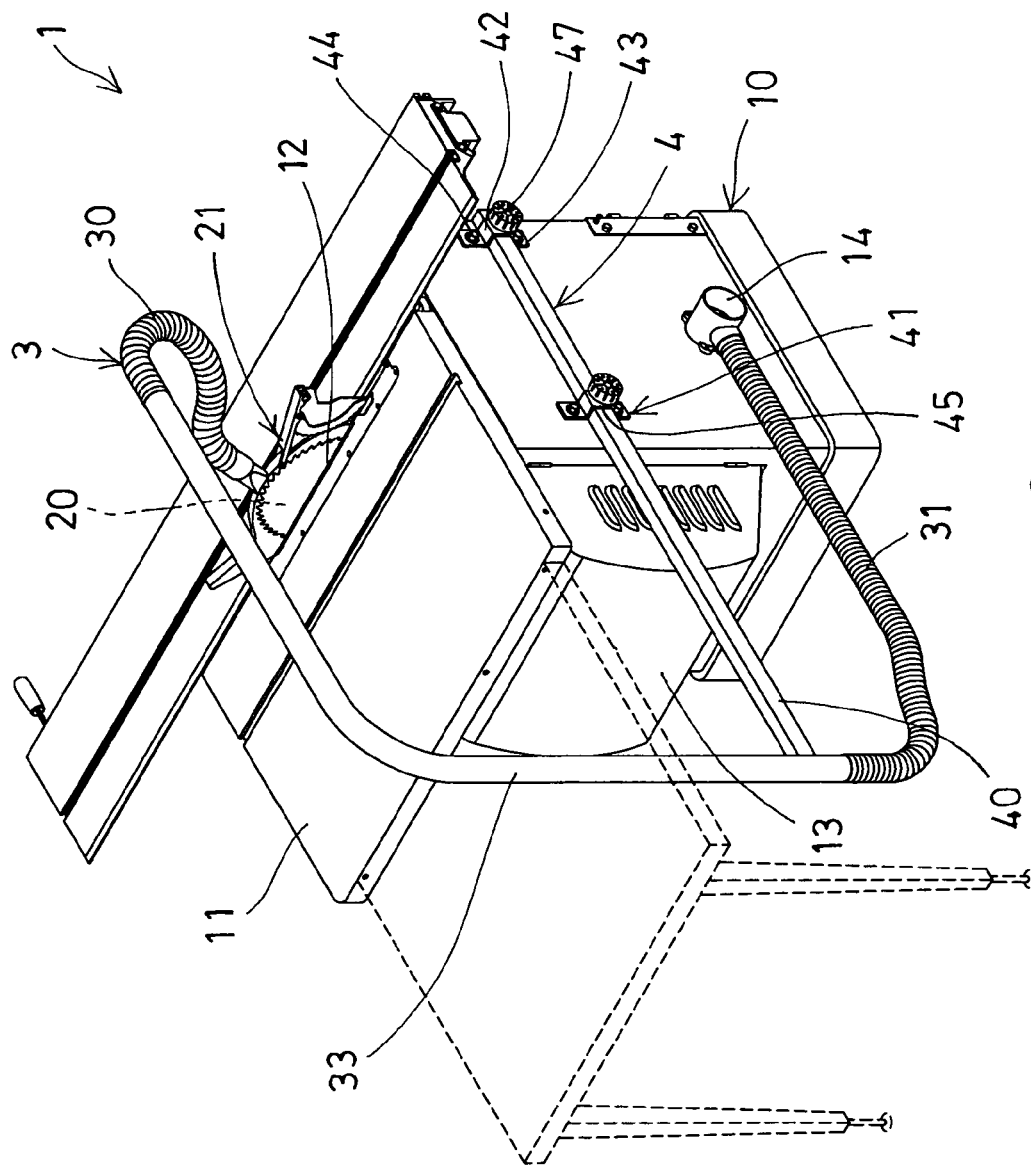
FIG. 2 is a perspective view of the work table.
Figure 3:
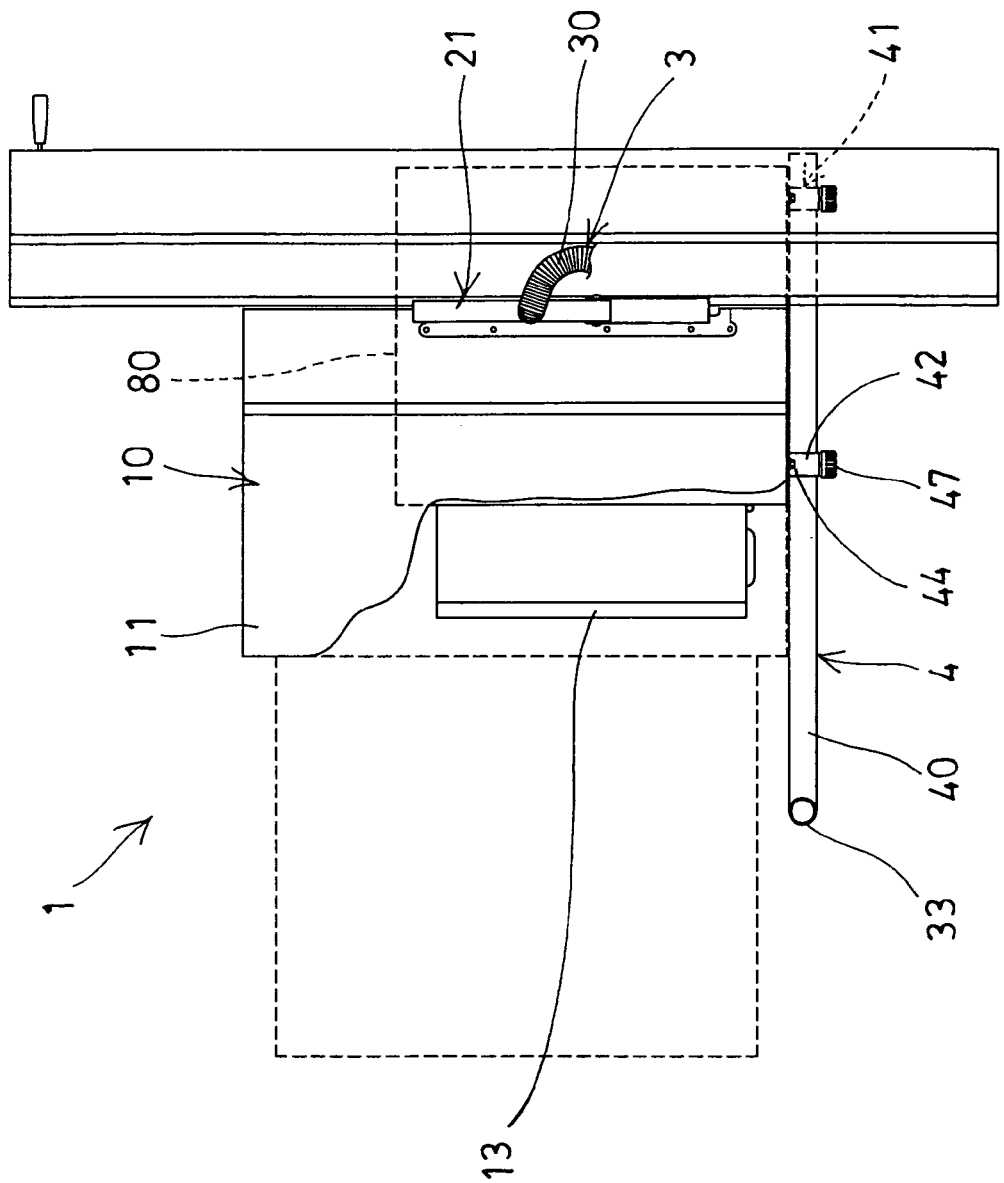
FIG. 3 is a top plan schematic view of the work table.

Referring to the drawings, and initially to FIGS. 1-3, a work table 1 in accordance with the present invention comprises a base table body 10 including a table plate 11 disposed on top for supporting work pieces 80 (FIGS. 3, 4), and including a slot 12 formed in the upper portion of the table plate 11 for receiving or attaching a machining tool device 20, such as a table saw or circular saw 20, a round saw, a milling tool, a cutting device, a grinding member or the like which may be used for working or machining the work pieces 80. A safety hood or shield 21 may further be provided and engaged with or onto the machining tool device 20 for covering or shielding the machining tool device 20 and for gathering or collecting or discharging the cut chips or the dust that may be generated by the tool device 20.

The table body 10 includes a door 13 openably attached thereto and rotatable or openable relative to the table body 10 (FIGS. 3, 4) for selectively reaching or entering into the table body 10 and for repairing or maintaining the tool members (not shown) received in the table body 10. For example, the table body 10 may include a vacuum device (not shown) attached or disposed therein for vacuuming or collecting or discharging the cut chips or the dust, and includes a coupler 14 (FIGS. 1, 2) for coupling to the vacuum device. The work table 1 in accordance with the present invention further comprises a hose coupling device 3 adjustably attached and supported on the work table with an adjustable supporting means or device 4 for suitably positioning the hose coupling device 3 to the work table 1 at the required or the predetermined position.

The hose coupling device 3 may include a first flexible hose member 30 coupled to the shield 21, a second flexible hose member 31 coupled to the vacuum device or the coupler 14 of the vacuum device, and a rigid or non-flexible hose member 33 coupled to the flexible hose members 30, 31 or coupled between the flexible hose members 30, 31. The adjustable supporting device 4 may include a rail or rod 40 extended from or attached to the hose coupling device 3, such as attached to the rigid hose member 33 of the hose coupling device 3, and includes one or more (such as two) brackets 41 each having a casing 42 and one or more (such as two) flaps 43 extended from the casing 42 for securing to the table body 10 with fasteners 44 or the like.

The casings 42 of the brackets 41 each includes a chamber 45 formed therein for slidably receiving the rod 40 and thus for adjustably attaching and supporting the hose coupling device 3 to the table body 10 of the work table 1, and each includes a screw hole 46 formed therein and communicating with the chamber 45 of the casing 42 for threading or engaging with a fastener 47 which may adjustably secure the rod 40 and the hose coupling device 3 to the table body 10 of the work table 1 at the required or the predetermined position and for the hose coupling device 3 from interfering with the working or the operation of the table body 10 of the work table 1.

Figure 4:
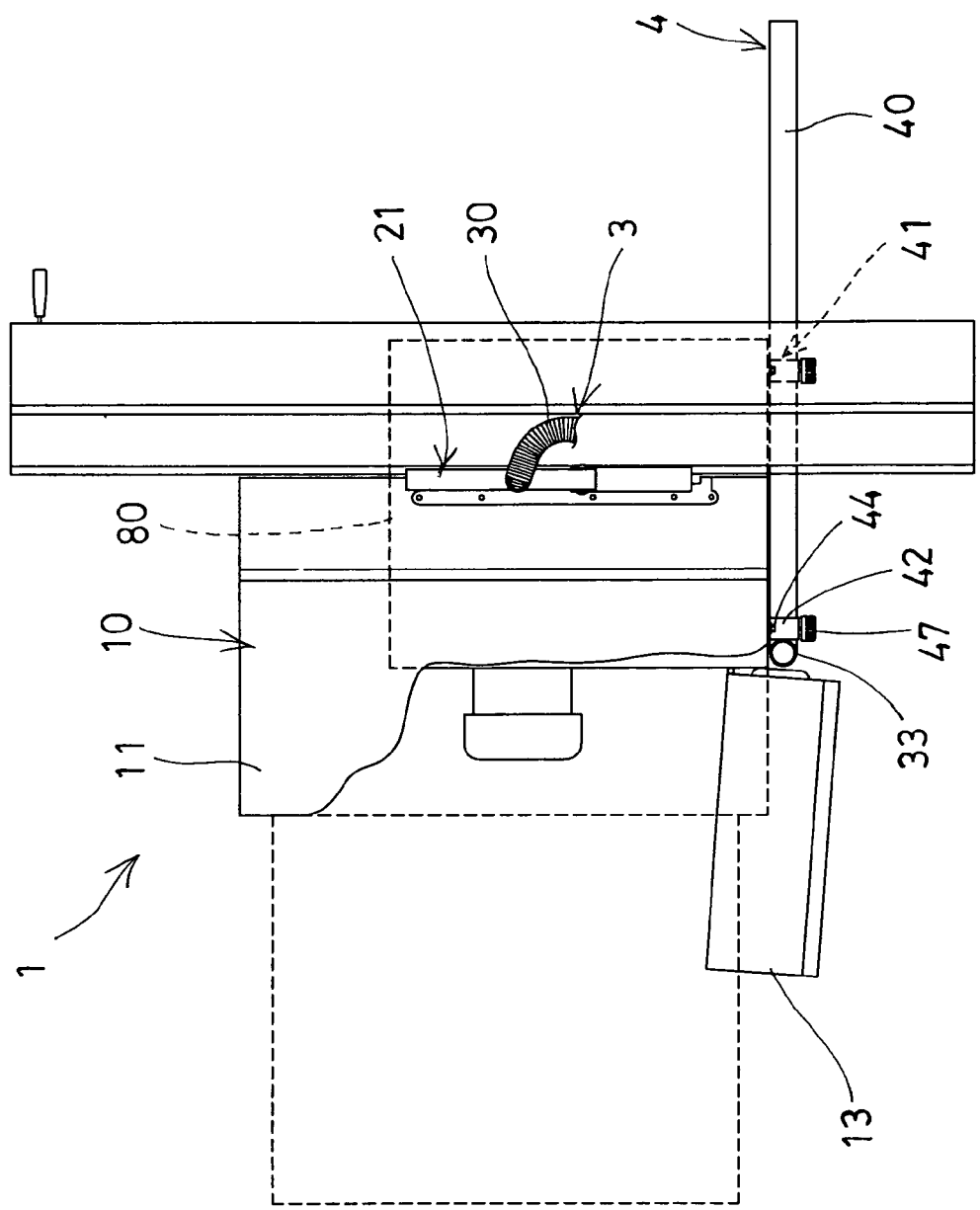
FIG. 4 is a top plan schematic view similar to FIG. 3, illustrating the operation of the work table.

In operation, as shown in FIG. 3, the rod 40 and the hose coupling device 3 may be moved and adjusted relative to the table body 10 of the work table 1 to any required or the predetermined position and may be adjustably secured to the table body 10 of the work table 1 at the required or the predetermined position by the fastener 47. As shown in FIG. 4, for example, when it is required to open the door 13 relative to the table body 10, the door 13 may be blocked or interfered with by the rod 40 and the hose coupling device 3. At this moment, the rod 40 and the hose coupling device 3 may be moved and adjusted relative to the table body 10 of the work table 1 to the other position for preventing the opening or the operation of the door 13 to be interfered with by the rod 40 and the hose coupling device 3.

Accordingly, the work table in accordance with the present invention includes a supporting device for adjustably attaching and supporting a hose to the work table and for suitably positioning the hose to the work table at the required or the predetermined position and for the hose from interfering with the operation of the work table.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A work table comprising:
a table body having a table plate disposed thereon for supporting a work piece, wherein said table plate has a slot formed therein for operatively attaching a tool device;
a hose coupling device which is adapted for connecting with a vacuum device to suck cut chips and dusts generated by said tool device, and comprises a first flexible hose member adjustably supported by said table body at a position in a vicinity of said slot for communication with said tool device, a second flexible hose member supported on said table body and arranged to communicate with said vacuum device, and a non-flexible hose member extended between and connecting said first and said second flexible hose members for allowing said cut chips and said dusts to be sucked from said first flexible host member to said second flexible hose member through said non-flexible hose member; and
an adjustable supporting device provided on said table body for adjustably and securely mounting said hose coupling device to said table body at a predetermined position so as to allow said vacuum device to remove by suction said cut chips and said dusts from said tool device through said hose coupling device as adjustably supported by said adjustable supporting device without interfering with an operation of said tool device, wherein said adjustable supporting device comprises a rod extended from said hose coupling device and further comprises at least one bracket having a casing and a plurality of flaps extended from said casing, said rod extended from said non-flexible hose member, wherein said bracket is mounted to said table body and said casing of said bracket forms a chamber therein, and wherein said rod is slidably received in said chamber for adjustably attaching said hose coupling device to said table body through at least one fastener for adjustably securing said hose coupling device to said table body at said predetermined position.

2. The work table, as recited in claim 1, further comprising a safety hood supported by said table body at a position near said slot for shielding said tool device, said safety hood connected with said first flexible hose member for guiding said cut chips and said dusts so as to be effectively removed by suction from said tool device.

3. The work table, as recited in claim 2, wherein said table body further comprises a door movably attached thereto for allowing a user to selectively gain access into said table body.

4. The work table, as recited in claim 1, wherein said table body further comprises a door movably attached thereto for allowing a user to selectively gain access into said table body.

* * * * *